Feb. 24, 1931.  F. McCORMICK  1,793,626
FACTORY APPARATUS FOR GROWING PLANTS
Filed Aug. 3, 1928   3 Sheets-Sheet 2
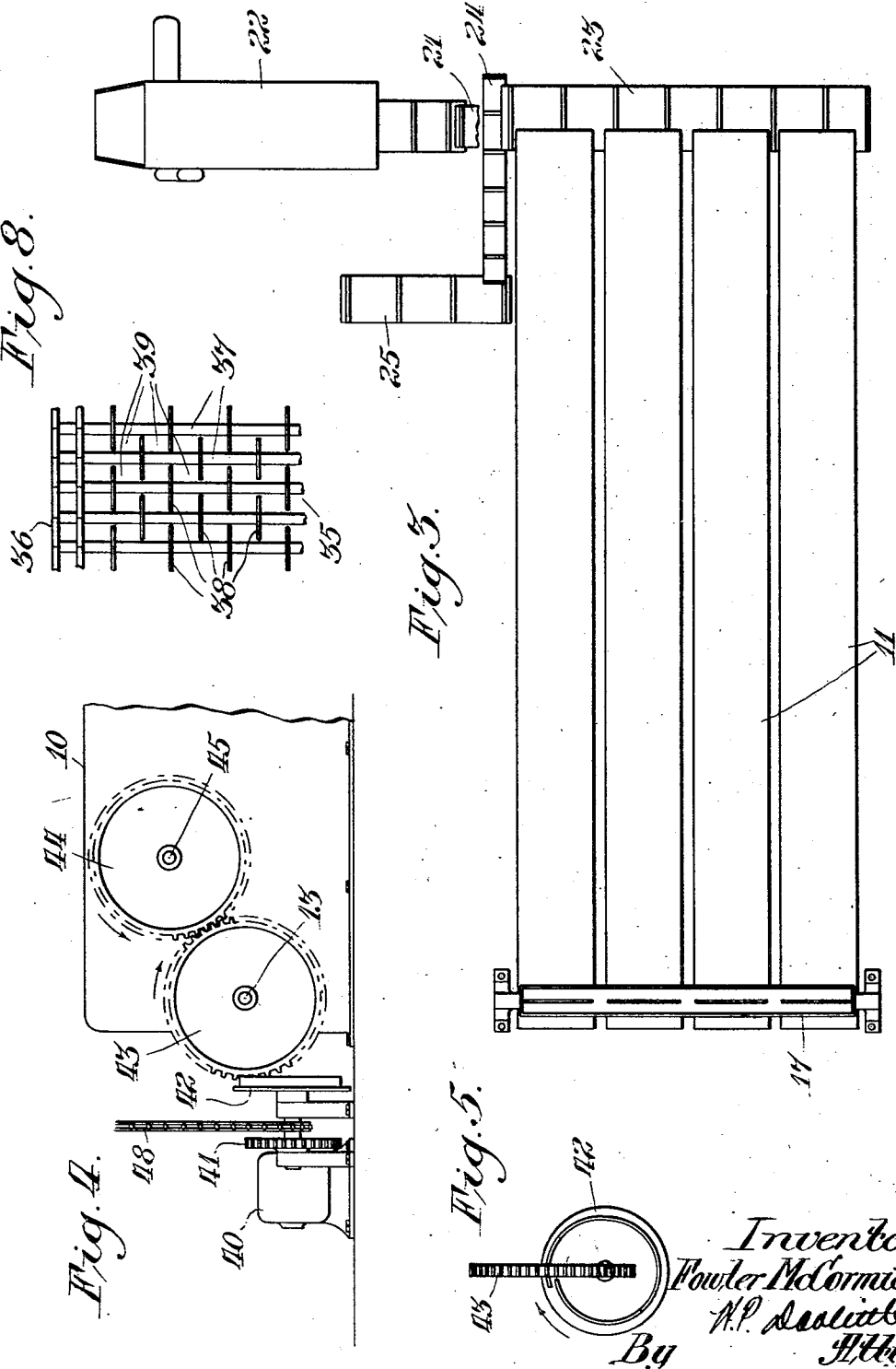

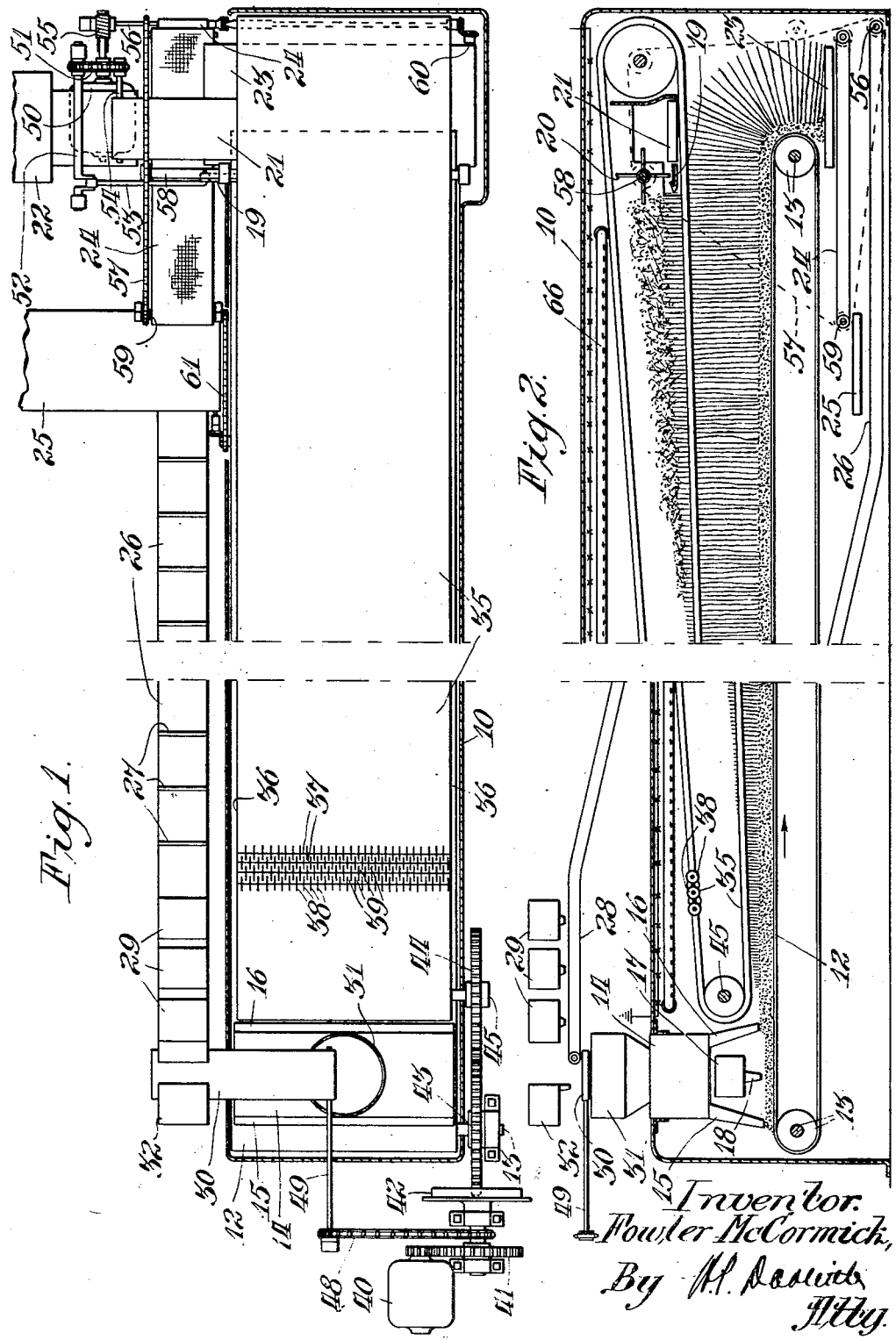

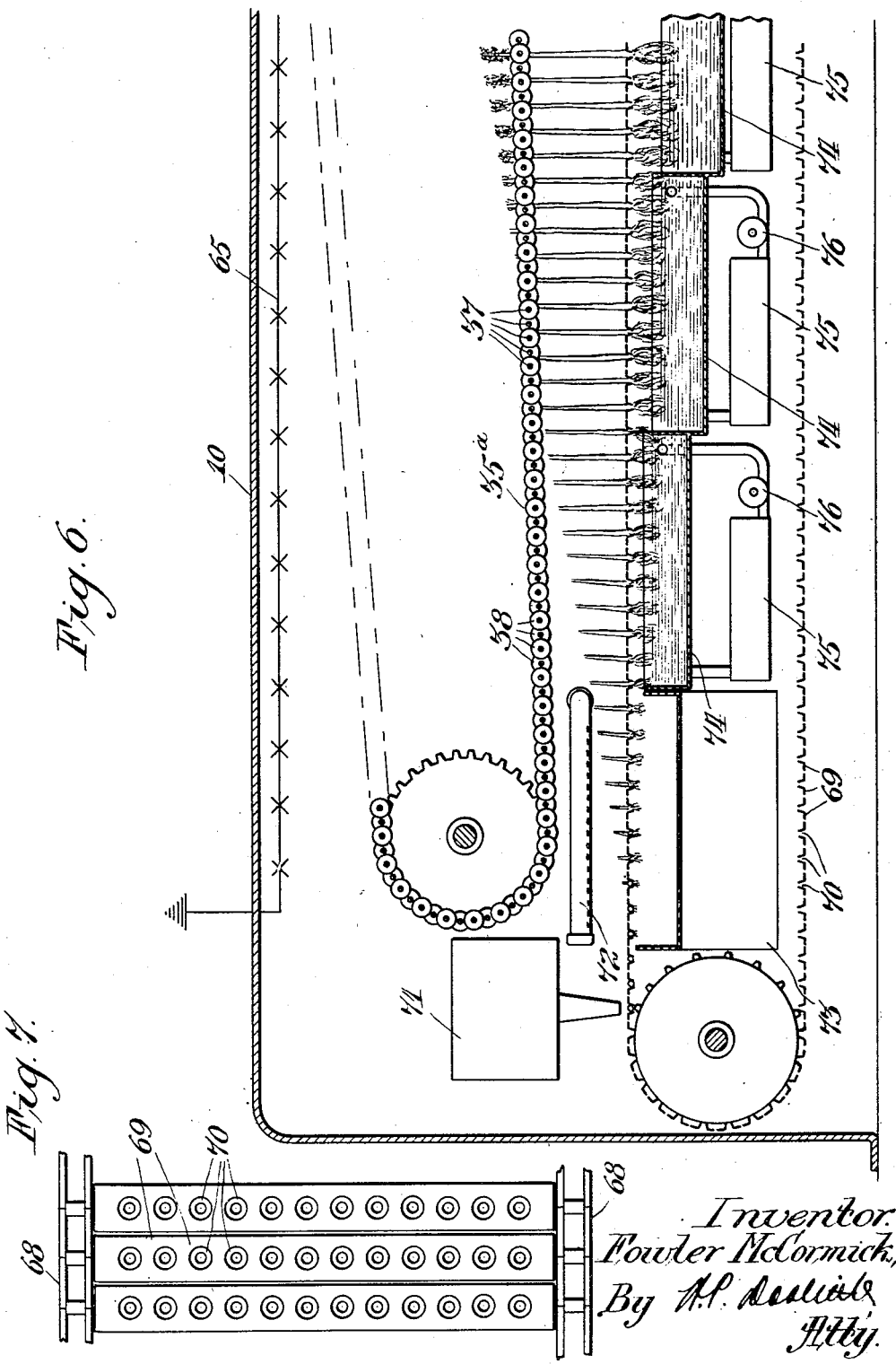

Patented Feb. 24, 1931

1,793,626

UNITED STATES PATENT OFFICE

FOWLER McCORMICK, OF CHICAGO, ILLINOIS

FACTORY APPARATUS FOR GROWING PLANTS

Application filed August 3, 1928. Serial No. 297,238.

My invention relates to the art of growing vegetation under controlled conditions and more particularly to apparatus and process for producing cereal or other crops under artificial environment.

The principal objects of my invention are to effect a continuous process of production of any given crop; materially to shorten the period normally required for the maturity of a crop; to eliminate the risks incident to normal production of crops; and generally to reduce the expense and labor and eliminate the uncertainties connected with present methods of agriculture by reducing the production of crops to what may be termed factory conditions.

The foregoing objects and other objects and advantages, which will become evident from the disclosure herein made, are achieved, in one embodiment of my invention, by providing, within an enclosure where all growing factors are under control, a movable growing bed or surface, such as an endless conveyor of suitable construction, at one end of which the crop to be grown is seeded by suitable mechanism, and at the other end of which it is mechanically harvested. The crop carrying bed or conveyor is moved at predetermined speed as the crop germinates and matures with the rate of movement timed with respect to the period required for maturity of the crop being grown and so computed as to subject the successively maturing plants throughout the length of the conveyor to the action of the harvesting mechanism progressively. Thereafter, mechanism may be provided for further acting on the crop and for restoring the crop bed material, or soil, if such is being used, to the seeding mechanism.

The organization above briefly described, together with other accessory apparatus is described in detail in the following specification and is illustrated in the accompanying drawings, wherein:

Figure 1 is a plan view of an installation embodying the invention;

Figure 2 is a side elevation of the apparatus illustrated in Figure 1, with a crop illustrated as in process of production;

Figure 3 is a plan view showing an arrangement of multiple conveyor units, employing the type of plant carrying conveyor illustrated on a larger scale in Figure 1;

Figure 4 is a side elevation of the driving mechanism seen in plan in Figure 1;

Figure 5 is a detail view of certain elements of the driving mechanism;

Figure 6 is a sectional, side elevation on an enlarged scale showing a modified form of conveyor structure;

Figure 7 is a detail view in plan of the modified conveyor; and

Figure 8 is a fragmentary plan view showing the structure of a sustaining conveyor.

In the embodiment of the invention herein selected for purposes of illustration, a preferred form of the installation may consist of an enclosure or growing house 10, the walls of which may be of any preferred material or construction and which are preferably opaque or impervious to sunlight and air.

The growing house serves as the enclosure for any suitable or desired number of growing beds 11 which are preferably arranged in parallel relation, as illustrated in Figure 3. As best seen in Figures 1 and 2, each growing bed will preferably consist of an endless belt or conveyor 12 having its upper run extending horizontally and supported on suitable shafts and rollers 13. The upper run of this conveyor is adapted to receive and support a growing crop, as will be later described and the length and width of the individual conveyors composing the installation or organization will, of course, be such as to meet the requirements of the crop being grown. At the initial end of the upper run of each conveyor there is provided means for depositing seed bed material on the conveyor and also means for depositing or sowing the seed. This may consist of a container 14 for the seed bed material or soil, which container may be provided with two horizontally spaced discharging spouts 15 and 16 in its base which deposit the seed bed material on the conveyor in two layers, as indicated in Figure 2. Between the discharge spouts 15 and 16 there is positioned a seed container 17, the spout 18 of which discharges between the discharge points of the spouts 15 and 16. Through this arrangement the spout 15 will first deposit a layer of seed bed material across the conveyor on which layer the spout 18 will deposit seed, which will in turn be covered by the material issuing from spout 16. It will be understood that the conveyor 12 is in constant movement in the direction of the arrow in Figure 2, which movement is very slow and so timed as to bring the crop to maturity within the time it takes for the seed deposited at any given point on the conveyor to travel a distance equivalent to the total length of the conveyor.

At the far end of the conveyor and in suitable relation thereto with respect to the character of the crop being grown, there will be provided mechanism for continuously harvesting the growing crop as the successively germinated plants arrive at maturity and are brought to the end of the conveyor. This harvesting mechanism may consist of a mower bar of the reciprocating type shown at 19 and positioned to head the grain crop being grown, as illustrated in Figure 2. Immediately above the mower bar there may be provided a harvesting reel 20 and immediately in the rear of the mower bar there can be mounted a transversely extending conveyor 21 which may extend outwardly beyond the growing house, as shown in Figure 1, and deliver the harvested material to suitable threshing mechanism indicated at 22.

The seed bed material and stalks left on the conveyor 12 after harvesting are discharged from the end of that conveyor to a transverse conveyor 23 located just below the end of the conveyor 12. Conveyor 23 in turn discharges on a screen conveyor 24 running at right angles and which serves to separate the stalks or straw from the seed bed material. The straw then discharges on a conveyor 25 running at right angles to the screen conveyor 24, which will deliver the straw at a selected location for disposal as may be desired. The material passing through the screen conveyor 24 is received on a soil return conveyor 26, the receiving end of which is located below the screen conveyor 24, as seen in Figure 2. The return conveyor 26 is disposed in parallel relation to the crop carrying conveyor or conveyors 12, and, of course, runs in reverse direction thereto. Conveyor 26 will preferably be formed with transverse vertical plates or webs 27 (Figure 1) to retain the soil, and will incline upwardly and have an elevated horizontal end portion 28 passing beneath one or more tanks 29 adapted to discharge on the conveyor the selected chemical constituents of the crop being grown. The re-fertilized soil on conveyor 26 is then discharged on a conveyor 30 which delivers it to a mixing hopper 31 containing suitable means for mixing the soil and chemicals and discharging the prepared materials to the container 14 from which it is again returned to the seed bed forming on conveyor 12. If necessary, a source of liquid supply, indicated at 32, may be disposed at the discharge end of the conveyor 26 to supply the requisite amount of moisture, or chemicals in solution, to the soil prior to delivery thereof to the mixer 31. As the crop being grown on the conveyor 12 progressively increases in height, necessity arises for maintaining the individual plants erect, so that the heads will be in proper relation to the harvesting mechanism when the full growth is complete and the end of the conveyor reached. For this purpose, there may be provided a sustaining conveyor 35, the lower run of which moves at equal speed with the crop carrying upper run of conveyor 12. The lower run of conveyor 35 is gradually inclined away from conveyor 12 in proportion to the gradually increasing height of the growing crop, and the distal end of conveyor 35 surrounds the mower bar 19, etc., composing the harvesting mechanism. The structure of the conveyor 35 is mesh-like, or open, so as to be readily penetrable by the individual plants comprising the crops.

In one possible form, the sustaining conveyor may be composed of edge cables or belts 36 (Figure 8) connected by closely spaced transverse rods 37 carrying plates or disks 38 arranged in staggered relation on the alternate rods and extending substantially to the adjacent rods, thus affording multiple rectangular openings 39 for reception of the growing plants. As illustrated by Figure 3, and also by Figure 6, the upper ends of the growing plants will pass through the lower run of the conveyor 35 and the grain bearing heads will be supported thereabove as they mature, finally being delivered to the harvesting mechanism.

Experiments heretofore conducted have demonstrated that certain crops, for instance wheat, can be matured under controlled environment in about thirty-five days. Assuming that a wheat crop is being grown with the apparatus above described, it will be necessary for conveyors 12 and 35 to be moved at a very slow rate of speed in order to keep the length of these conveyors within practicable limits. That is to say, it must take thirty-five days for a given point on conveyors 12 and 35 to move from the point of seed reception to the point of harvesting. As one possible means for driving the conveyors 12 and 35, I have shown a source of power 40, such as an electric motor, which, through reduction gearing indicated at 41, drives a large helical cam wheel 42, the cam track of which is in mesh with the gear teeth on a large gear wheel 43 fixed to the shaft 13 supporting the rear end of the conveyor 12. The gear wheel 43 is in mesh with a second gear wheel 44 of equal diameter fixed on the shaft 45 supporting the rear end of conveyor 35. A slow drive to both conveyors at equal speeds is thus transmitted. Incidentally the soil delivering conveyor 30 will preferably be driven, at somewhat higher speed, from the motor 40. This may be accomplished by a sprocket chain 48 connecting the shaft carrying cam wheel 42 with a shaft 49 supporting the discharge end of conveyor 30. A separate source of power 50 (Figure 1) will preferably be provided for the threshing and harvesting mechanisms and the conveyors 21, 23, 24, 25 and 26. The speed of these mechanisms will also be slow, depending somewhat on the number of growing conveyors employed in an organization, such as illustrated by Figure 3, and, therefore, the quantity of material discharged therefrom. As one possible arrangement of driving elements, I have shown the armature shaft of motor 50 connected by reduction gearing 51 with a crank shaft 52, which actuates a pitman 53 for actuating the mower bar 19. This gearing also drives a shaft 54 supporting the discharge end of the grain receiving conveyor 21. A second reduction gear connection at 55 connects the motor with a drive shaft 56. A sprocket chain 57 driven by shaft 56 is trained over a sprocket on a shaft 58 carrying the harvester reel 20 and also one on the shaft 59 supporting one end of the screening conveyor 24. At its far end the shaft 56 is geared to the supporting shaft 60 of the conveyor 23. The straw disposal conveyor 25 may be driven by a chain 61 from one end of shaft 59.

As an essential feature of the system of crop production herein disclosed, it is contemplated that the artificial conditions known to be most effective in causing early maturity of the crop shall be caused to exist within the enclosure or growing house 10. This includes provision of means for electrically producing light and other forms of radiant energy, indicated diagrammatically at 65 (Figure 6). It is also contemplated that selected liquids and gases will be sprayed on the crop and introduced into the growing house from an external source or sources, as by means of conduits in the roof of the enclosure, as at 66. Provisions for maintaining any desired temperature within the enclosure and, if found desirable, for causing circulation or flow of the artificial atmosphere, will also be made.

In Figures 3, 6 and 7, I have illustrated a modified embodiment of my invention in which the use of growing bed material or soil as the means for receiving and sustaining the root portions of the plants is done away with and the apparatus correspondingly simplified In this embodiment there will be used a movable crop growing conveyor of special construction in which the individual plants comprising the crop are carried on perforated plates with the roots depending below and immersed in baths containing plant nutrient chemicals in solution. In one preferred form the conveyor may be composed of side chains 68 (Figure 7) carrying cross-plates 69 having closely spaced cup shaped depressions 70 of small diameter formed with perforated bottoms and adapted to retain one or more seeds. This conveyor will travel in the manner heretofore disclosed and at its initial end there will be provided seeding mechanism, indicated at 71, adapted to deposit seed in the cups 70. The deposited seeds will be provided with moisture, etc., during the germinating stage and stages of early growth, as from an overhead conduit 72, and excess liquids will be received and carried away by a drain channel 73. As the pendent roots acquire sufficient length, they will travel over and be immersed in one or more tanks 74 located immediately below the upper run of the conveyor. These will preferably be divided, as shown, so that the contained solutions may be varied to furnish the growing plants with the nutrient best suited to it at the various stages of growth and each tank will have means for circulating the liquid and renewing its chemical content such as a chemical supply tank 75 having inlet and outlet pipes leading to the tank one of which passes through a pump or impeller 76. The growing crop will be received and supported by a conveyor 35ª which can be the same as heretofore described, and the crop will be harvested and delivered to threshing machanism, as shown by Figures 1 and 2. As no soil will be used, the return conveyor will be eliminated.

From the foregoing disclosure, it will be clear that I have provided a novel organization of means for growing crops mechanically and under controlled conditions and that I have provided an organization which is largely automatic in its operation. The manifold advantages arising from practice of the invention will be appreciated upon consideration. It will also be evident that the structural details herein disclosed are merely by way of examples and that a wide range of substitution and modification is possible without departure from the scope of the invention as defined in the following claims.

What I claim as new is:

1. The combination of means for transportably supporting vegetation during growth, means for causing gradual transition of the vegetation supporting means from one point to another in a predetermined interval of time co-extensive with the period of maturity of the vegetation carried thereby, and harvesting means located to be reached by the vegetation in transit at the expiration of that predetermined interval.

2. The combination of means for transportably supporting vegetation during growth, means for subjecting the vegetation to sources of growth stimulation, means for causing gradual transition of the vegetation supporting means from one point to another in a predetermined interval of time coextensive with the period of maturity of the stimulated growth, and harvesting means located to be reached by the vegetation in transit at the expiration of that predetermined interval.

3. The combination of a conveyor adapted to carry a growing crop, means on the conveyor for receiving the root portions of growing plants, means at one position adjacent the path of the conveyor for initiating crop growth thereon, means for causing transit of the conveyor away from said position during growth of the crop, and means at another position in the direction of transit of the conveyor for harvesting the crop.

4. The combination of a conveyor adapted to carry a growing crop, means on the conveyor for receiving the root portions of growing plants, means for causing progressive movement of said conveyor towards a given point, means at one position remote from said point and adjacent the path of the conveyor for continuously delivering seed thereto, and continuously acting harvesting means located at the point towards which the conveyor moves and positioned to operate on a crop carried thereby.

5. The combination of an endless conveyor adapted to carry a growing crop and having its upper run lying in a substantially horizontal plane, means on the conveyor for receiving the root portions of growing plants, means contiguous to one end of said upper run for initiating crop growth thereon, means contiguous to the other end for harvesting a crop carried by the conveyor, and means for actuating said conveyor to move its upper run towards the harvesting means.

6. The combination of means for transportably supporting vegetation during growth, an enclosure therefor composed of opaque material and having space within for transit of said vegetation supporting means, means for causing gradual transit of the supporting means at a uniform slow rate of speed towards a given point within the enclosure as growth progresses, and means for supplying radiant energy within the enclosure.

7. The combination of an endless conveyor adapted to carry a growing crop and having its upper run lying in a substantially horizontal plane, means on the conveyor for receiving the root portions of growing plants, means at one end of the path of movement of said upper run for planting seed thereon, means at the other end for harvesting a crop growing on the conveyor, and means for simultaneously actuating all said means at speeds timed with relation to the period of growth of the crop carried by the conveyor.

8. The combination of an endless conveyor adapted to carry a growing crop and having its upper run lying in a substantially horizontal plane, means contiguous to one end of the path of movement of said upper run for initiating crop growth thereon, means contiguous to the other end for harvesting a crop growing on the upper run, means for actuating the conveyor to move the upper run towards the harvesting means in timed relation to the period of crop maturity, and means movable with the conveyor for sustaining the crop during growth.

9. The combination of an endless conveyor adapted to carry a growing crop and having its upper run lying in a substantially horizontal plane, means at one end of the path of movement of said upper run for depositing seed bed material and seed thereon, means at the other end for cutting the crop growing on the conveyor, means adjacent this end for receiving the seed bed material discharged from said conveyor, and means for actuating the conveyor to move the upper run towards the cutting means in timed relation to the period of crop maturity.

10. The combination of an endless conveyor adapted to carry a growing crop and having its upper run lying in a substantially horizontal plane, means at one end of the path of movement of said upper run for depositing seed bed material thereon including a container for said material, seed depositing means in cooperative relation to said material depositing means, means at the other end for cutting the crop growing on said conveyor, means adjacent this end for receiving the seed bed material discharged from the conveyor, means for returning the discharged material to the container, and means for actuating the conveyor to move the upper run towards the cutting means in timed relation to the period of crop maturity.

11. The combination of an endless conveyor adapted to carry a growing crop and having its upper run lying in a substantially horizontal plane, means at one end of the path of movement of said upper run for depositing seed bed material thereon including a container for said material, seed depositing means in cooperative relation to said material depositing means, means at the other end for cutting the crop growing on said conveyor, means adjacent this end for receiving the seed bed material discharged from the conveyor, means for returning the discharged material to the container, means operating in conjunction with the material returning means for treating the seed bed material prior to delivery thereof to the container, and means for actuating the conveyor to move the upper run towards the cutting means in timed relation to the period of crop maturity.

12. In apparatus of the class described, the combination of a conveyor supported for movement horizontally and adapted to carry plants in process of growth, means for causing gradual horizontal transit of the conveyor as plant growth progresses, means for sustaining the upper portions of the plants during growth comprising a net-like structure penetrable by the growing plants and disposed over the conveyor, and means for causing transit of the net-like structure at even speed with the conveyor.

13. In the art of intensive crop culture, the combination of a movably supported crop bed, means for continuously depositing seeds upon the moving bed for germination and growth, means for moving the bed at a slow rate of speed towards a place of harvesting, as the growth progresses, in timed relation to the period of plant maturity, and means at the harvesting place for continuously harvesting the matured plants.

In testimony whereof I affix my signature.

FOWLER McCORMICK.